3,357,924
CORROSION INHIBITOR
Georges Molinet, Pau, and Alexis Lavion, Mourenx,
France, assignors to Societe Nationale des Petroles
d'Aquitaine, Paris, France
No Drawing. Filed Aug. 9, 1965, Ser. No. 478,468
Claims priority, application France, Aug. 13, 1964,
985,085
5 Claims. (Cl. 252—171)

The present invention concerns a method of inhibiting the corrosion of metals when they reside in certain industrial liquids and, particularly, in aqueous or anhydrous dimethylsulphoxide; the invention covers a new group of compounds capable of protecting against the corrosion of metals in such liquids, which protection takes place when these compounds are added in small amounts to the liquid.

The problem of corrosion arises in connection with practically all liquids which come in contact with metals. Considerable research has resulted which has led technicians to add any one of numerous substances to the liquids in order to attenuate the corrosive action. More particularly, a large group of inhibitors, mostly bases, has also already been recommended for counteracting the attack on iron, steel and other metals by anhydrous or aqueous dimethylsulphoxide. The particular case of dimethylsulphoxide is of industrial importance, which importance increases every day, since this compound has for many years found more numerous interesting applications. Thus, in addition to its use as a solvent, it is very useful as a heat-transfer liquid. On the other hand, dimethylsulphoxide has a certain aggressive action on the commonly-used metals, particularly under heat; it is, therefore, expedient to remedy this tendency to corrosion so as to permit the use of this liquid industrially, particularly for the cooling of engines.

The addition of organic or inorganic bases in accordance with one known process provides a very marked improvement in the behavior of the metals in contact with the dimethylsulphoxide. However, this solution still does not sufficiently resolve the problem, because the favorable effect of the bases does not last long enough. It operates to inhibit corrosion for about a fortnight in the case of steel in more or less aqueous dimethylsulphoxide at about 80° C., but the corrosion again becomes noticeable after a month. On the other hand, when it is a question of anhydrous dimethylsulphoxide or dimethylsulphoxide containing a little water, the lack of solubility of the conventional bases in this liquid makes it necessary to use relatively costly amines, such as the polyethoxylated fatty amines.

It is, therefore, an outstanding object of the invention to provide a composition for inhibiting the corrosion of common metals in the presence of industrially-important liquids.

Another object of this invention is the provision of a method of inhibiting the corrosion of iron and steel in the presence of anhydrous or aqueous dimethylsulphoxide.

A further object of the present invention is the provision of a means of preventing corrosion of iron and steel by dimethylsulphoxide, which means is relatively inexpensive and which means is effective for long periods of time.

With the foregoing and other objects in view, which will appear as the description proceeds, the invention resides in the combination and arrangement of elements and in the details of procedure hereinafter described and claimed, it being understood that changes in the precise embodiment of the invention herein disclosed may be made within the scope of what is claimed without departing from the spirit of the invention.

In general, the present invention provides an improvement in the art of inhibiting corrosion, making it possible to avoid the metal being attacked for periods much longer than has been possible heretofore. This result is possible even at fairly high temperatures, particularly at 80° C. and above, as well as at ambient temperature. Furthermore, the inhibition in accordance with the invention keeps the liquid practically colorless, this being contrary to what happens in the presence of the prior art inhibitors; the known inhibitors do not prevent a strong coloring being produced, even if the attack on the metal is slight.

The present invention results from the unexpected discovery that the replacement of the base-type inhibitors by carboxylic acids derived from alkylene amines bring about an improved inhibiting effect at a pH value equal to that of the treated liquid.

Thus, the process in accordance with the invention consists in dissolving a small quantity of an alkylene amine carboxylic acid in the corrosive liquid; in the inhibiting acid the carboxy group or groups are connected to alkylenes which are themselves bonded to the nitrogen of the amine; it is also possible with advantage to use a salt of such an acid.

The preferred acids are alkylene polyamine carboxylic acids, particularly those in which all the nitrogen atoms are connected to alkylene carbon atoms.

Depending on circumstances, the concentration of the inhibitor may vary from 0.002 up to 0.5 equivalent of acid per litre of liquid, the preferred range being between 0.008 and 0.08 equivalent; excellent results are generally obtained with anhydrous or aqueous dimethylsulphoxide by using 0.01 to 0.05 equivalent of an inhibiting acid, such as ethylenediamine tetracetic acid.

The new industrial products which form the subject of the present invention are corrosion inhibitors comprising at least one alkylene amine carboxylic acid or acid salt, and preferably polyalkylene polyamine polycarboxylic acid or acid salt, of which the molecule contains one or more of the following groups:

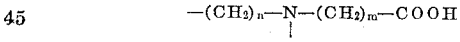

and/or

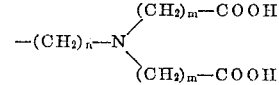

$n$ and $m$ being different or identical integers, which can vary within wide limits, for example from 1 to 32, but usually from 1 to 4.

The compound which can be used with particular advantage and which is freely obtainable commercially is ethylenediamine tetracetic acid,

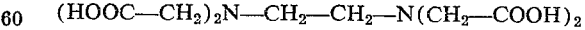

known as "sequestrating" or "chelating," in the form of a free acid or in the form of its salts, particularly the sodium salt. However, other acids of the same type, having different numbers of —$CH_2$— groups, nitrogen atoms, and carboxyl groups are also suitable. For example, it is possible to use ethylene-diamine mono- di- and tri-acetic acids, ethylenediamine mono- to tetra-propionic acids or ethylenediamine butyric acids, acids derived from diethylenetetramine, hexamethylenetetramine, propylenediamine or other polyalkylene polyamines.

As the corrosion inhibition is particularly effective when the corrosive liquid is made basic (corresponding to pH values from 7 to about 12, if this liquid is aqueous), one advantageous form of the invention consists in using the aforementioned alkylene amine carboxylic acids in the form of salts of alkali, of alkaline earth metals, of ammonia, of quaternary bases of ammonium, of hydrazine and of different amines. In particular, a marked improvement in the resistance to corrosion of ferrous metals in dimethylsulphoxide is found when the bases used as inhibitors in accordance with the known art (for example, morpholine, diethanolamine, triethanolamine, fatty amines with 18 to 20 carbon atoms, etc.) are used in the form of their salts of the acids according to the present invention.

The invention also covers, as a new industrial product, any liquid of greater or lesser corrosive action which contains a small quantity of one or more of the inhibitors as described above and based on alkylene amine carboxylic acids. It covers particularly the solutions of small quantities of such inhibitors in dimethylsulphoxide, alone or mixed with other liquids, especially with water; the preferred solutions contain 0.002 to 0.5 equivalent of alkylene amine carboxylic acid per litre or better still, 0.008 to 0.08 equivalent per litre.

The invention is illustrated in a non-limiting manner by practical examples of its application as hereinafter described. In these examples, and also in the comparsion tests which precede them, the dimethylsulphoxide is designated by the abbreviation DMSO.

COMPARISON TESTS

*Test I.*—A steel test element was immersed in anhydrous DMSO for 60 days at ambient temperature. After this time, the test element was strongly oxidized, while the liquid had assumed a reddish-brown color.

*Test II.*—The procedure of Test I was repeated with DMSO containing 10% of water. From the seventh day, a coloring appeared and this became a deep reddish-brown after sixty days; the test element was seriously attacked at the end of this latter period.

*Test III.*—In Test I, the steel was replaced with iron and a much stronger attack on the metal was found, while the solution assumed a very deep coloring.

*Test IV.*—The operation according to Test II, that is to say, with 10% of water, was repeated with iron instead of steel; the very intense corrosion resulted in an average loss of weight of iron of 0.1 g./m.$^2$/hr., while the liquid became almost black, after having shown a deep coloring from the seventh day.

*Test V.*—DMSO containing 3% of water was added to 1% of a known commercial inhibitor, sold under the trade-mark "Norust P.R." formed of polyethoxylated fatty amines having 14 to 24 carbon atoms; iron test elements were immersed in the solution, after which the liquid was kept at 80° C. for 30 days and then at normal temperature for 50 days.

The average loss in weight of the test elements for the total duration of 80 days was 0.011 g./m.$^2$/hr. and the liquid was black.

*Test VI.*—The conditons of Test V were applied to steel test elements; the average weight losses were smaller, (0.007 g./m.$^2$/hr.), but the liquid appeared almost black.

*Test VII.*—DMSO with 3% of water was added to 1% of the prior art corrosion inhibitor, morpholine, in this liquid. After 30 days at 80° C. and 50 days at ambient temperature, respectively, the same results as in the comparison Tests V and VI were found on the iron and steel samples.

EXAMPLES

*Example I.*—A steel test element was immersed in DMSO to which had been added, per litre, 30 ml. of water containing in solution 0.005 mol. of ethylenediamine tetracetic acid (EDTA), i.e., 0.02 equivalent of this acid per litre of liquid or 0.146% by weight. The pH of the latter was then 8.7. After being in contact with the DMSO for 97 days at normal temperature, the steel had not suffered any corrosion and no coloring had been produced in the liquid.

*Example II.*—Example I was repeated with DMSO containing 10% of water; the pH was then 7.7 and no attack or coloring was apparent.

*Example III.*—The conditions of Example I were applied to iron specimens instead of steel; no corrosion or coloring was found.

*Example IV.*—In technical DMSO, not containing any water other than its normal humidity, there was dissolved 0.001 mol. of sodium (tetrasodium) ethylenediamine tetracetate per litre, i.e., 0.004 equivalent per litre. The pH of the liquid was 12.2. Small steel plates were immersed in one portion of the same liquid and iron test elements in another portion.

After being in contact for 90 days at normal temperature, no sign of attack was apparent on either of the two types of specimens, and the DMSO remained completely colorless.

*Example V.*—The conditions were the same as in Example IV, except that the DMSO contained 10% of water and the pH value was 11.2. The specimens also remained intact after 90 days, but the liquid assumed a very slightly yellowish tint.

*Example VI.*—Instead of the tetrasodium salt of EDTA (as used in Examples IV and V), the DMSO containing 10% of water had added thereto 0.005 mol. of the disodium salt of this acid per litre, i.e., 0.02 equivalent per litre. The pH value was then 9.1.

After 90 days at ambient temperature, no sign of oxidation was found on the iron or steel; the liquid had assumed a coloring, but this was in no way comparable with that of the comparison tests I to VII.

*Example VII.*—The DMSO with 3% of water and 0.005 mol. of EDTA, as in Examples I to III, was kept in contact with steel and iron test elements, first of all for 30 days at 80° C. and then for 50 days at ambient temperature. At the end of this experiment, the specimens showed very little sign of attack, while the liquid had a yellow color.

The following average weight losses, in g./m.$^2$/hr., were found:

0.005 for the iron, and
0.004 for the steel, this being scarcely half the respective values found in the comparison tests V to VII.

While it will be apparent that the illustrated embodiments of the invention herein disclosed are well calculated to fulfill adequately the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A composition of anhydrous liquid dimethyl sulfoxide and as a corrosion inhibitor, therefore a substance selected from the group consisting of ethylene diamine, diethylene tetramine and hexamethylene tetramine derivatives of mono, di, tri and tetra acetic, propionic and butyric acid and their alkali metal, alkaline earth metal, ammonia, amine and quaternary base of ammonium salts in a concentration of 0.002–0.5 equivalent per liter of the dimethyl sulfoxide.

2. The composition of claim 1 wherein the dimethyl sulfoxide is a 3–10% aqueous solution.

3. A method for inhibiting the corrosion of metals in liquid aqueous or anhydrous dimethylsulphoxide, which consists of dissolving in the liquid an amount in the range from 0.002 to 0.5 equivalent per liter of the liquid of a substance selected from the class consisting of the alkylene polyamine carboxylic acid and salts of claim 1.

4. A method as recited in claim 3, wherein the said acid has in its molecule at least one group $$-(CH_2)_n-N-(CH_2)_mCOOH$$

in which each of the numbers $n$ and $m$ is an integer in the range from 1 to 32.

5. A method as recited in claim 3, wherein said acid has in its molecule at least one group $$-(CH_2)_n-N\begin{matrix}(CH_2)_m-COOH\\ (CH_2)_m-COOH\end{matrix}$$

in which each of the numbers $n$ and $m$ is an integer in the range from 1 to 32.

References Cited

UNITED STATES PATENTS

| | | | |
|---|---|---|---|
| 1,981,109 | 11/1934 | Klamroth et al. | 252—151 |
| 2,396,938 | 3/1946 | Bersworth | 252—86 |
| 2,818,388 | 12/1957 | Sullivan et al. | 252—75 |
| 2,948,683 | 8/1960 | Sullivan et al. | 252—75 |
| 3,055,749 | 9/1962 | McDermott | 252—171 |
| 3,116,105 | 12/1963 | Kerst | 252—180 |

LEON D. ROSDOL, *Primary Examiner.*

W. E. SCHULZ, *Assistant Examiner.*